UNITED STATES PATENT OFFICE.

WOOLSEY McA. JOHNSON, OF IOLA, KANSAS.

PROCESS OF TREATING FERRUGINOUS BLENDE.

No. 868,345.     Specification of Letters Patent.     Patented Oct. 15, 1907.

Application filed January 11, 1904. Serial No. 188,545.

*To all whom it may concern:*

Be it known that I, WOOLSEY McA. JOHNSON, a citizen of the United States, residing at Iola, in the county of Allen and State of Kansas, have invented certain new and useful Improvements in Processes of Treating Ferruginous Blende, of which the following is a specification.

This invention is a process of treating ferruginous blende, or low grade ore containing iron, zinc and sulfur. I will describe my process by reference to a specific example thereof, it being understood, however, that my invention is not limited to the precise procedure set forth, or to the treatment of the particular ores specified.

I may treat an ore containing as its essential constituents zinc, iron and sulfur, say in the proportion of zinc 40%, iron 20% and sulfur 30%, and containing also in smaller proportion sulfids of copper and lead, and precious metals. Such ore, after suitable crushing, is roasted at a low temperature, about 850–900° C., in any suitable roaster, preferably of a continuously operating muffle type. By such low temperature roasting the zinc and iron are largely converted into oxids and are thereby rendered much easier of reduction in the following operations. The roasting need not be complete, and in practice the sulfur is not reduced below 3%; this results in the production of a rich gas suitable for conversion into sulfuric acid, and the residual sulfur performs important functions as hereinafter fully set forth.

The product of the roasting operation may be mixed with carbon in suitable amount, say 35%, and at once subjected to such temperature, say 850–950° C. as will suffice to reduce the oxid of iron to sponge iron while leaving the zinc oxid substantially unreduced. Inasmuch as zinc oxid requires about 1100–1150° C. for its reduction, this is readily accomplished. Or I may effect this reduction of the iron oxid to sponge iron by means of natural gas or other suitable reducing agent, and such gas or reducing agent may be employed to the exclusion of solid carbon or in conjunction therewith. The reduced iron is disseminated throughout the body of the charge and therefore reacts readily to separate zinc as hereinafter described. The product of this reduction, containing in addition to the sponge iron and zinc oxid, sulfids of zinc, lead and copper, the precious metals, and admixed carbon may be subjected at once to such higher temperature as will suffice for the distillation of the zinc. This operation is preferably carried out by means of the electric furnace, the heat being conveniently developed in the conductive charge by the passage of the current between carbon or graphite terminals in contact therewith. This distillation proceeds with great readiness and with but slight consumption of current, because the electric furnace treatment of the charge is begun at a temperature but a few hundred degrees below that required for the reduction of the zinc, and if desired at a temperature closely approximating this point. The zinc sulfid remaining in the charge is, under these conditions, reduced by the iron in accordance with the equation—

$$Fe + ZnS = FeS + Zn.$$

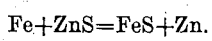

I have found in practice that this reaction works exceptionally well in the electric furnace, and accordingly the original roasting need not be complete, such incomplete roasting having the further advantage of giving a gas rich in sulfur dioxid and particularly suitable for the manufacture of sulfuric acid, as above mentioned. The iron sulfid formed constitutes a principal constituent of a matte which may be tapped continuously or at intervals from the electric furnace, and which will be found to contain the precious metals of the original ore. Any desired process may be employed for their separation and recovery. The distilled zinc may be collected as spelter or as oxid, according to known methods, it being understood that in the former case the operation will be conducted in a substantially air-tight furnace and that no undue dilution of the metal vapors will be permitted. I prefer to reduce substantially all of the iron before separating the zinc, but such complete reduction is not an essential part of my process.

The production of iron and zinc in successive periods of a single operation presents marked advantages. The reduction of the iron may be completed at temperatures at which no zinc is distilled, and is readily accomplished by heat derived from the combustion of carbon or of gaseous reducing agents. The entire charge, including the zinc oxid, is by this means brought nearly to the temperature requisite for the electric furnace operation. The presence of the reduced iron in the charge is a distinct aid to the electric furnace reduction, serving to reduce the zinc sulfid as above stated, and thereby yielding a matte in which the precious metals are effectively collected. If it were attempted to reduce the oxids of zinc and iron simultaneously and in a single operation, providing sufficient heat for the purpose, not only would the advantage of current economy be lost, but the large amount of carbon monoxid rising from the reduction of the iron oxid would so dilute the zinc vapor as to render impossible the condensation of the zinc as spelter. In practice I have found the current economy to be such that much less electric energy is required to reduce a ferruginous ore than would be necessary to produce an equal amount of zinc directly in the electric furnace from an ore free from iron. Furthermore the presence of the sponge iron in the electric furnace charge renders the same conductive and particularly adapts its for treatment in a resistance furnace such as is shown in my copending application Serial No. 188546, filed January 11, 1906, wherein the heat is developed by the passage of the current through the charge.

Any suitable or preferred means may be employed for carrying out my process. Thus I may use a roaster, a device for incorporating carbon with the roasted ore, a reducing furnace for oxid of iron, and an electric furnace for the distillation of the zinc, means being provided for the continuous or intermittent transfer of the charge between these several furnaces, and through said furnaces; or if desired, I may carry out two or all of the steps of my process in a single furnace chamber, without transferring the ore therefrom. In the latter case, however, the operation is necessarily intermittent.

I claim:—

1. The herein described method of producing zinc, which consists in passing an electric current through a charge containing a compound of zinc and metallic iron, thereby heating the charge and reducing the compound of zinc.

2. The herein described method of producing zinc, which consists in passing an electric current through a charge containing a compound of zinc, metallic iron and carbon, thereby heating the charge and reducing the compound of zinc.

3. The herein described method of producing zinc, which consists in passing an electric current through a charge containing a compound of zinc and sponge iron, thereby heating the charge and reducing the compound of zinc.

4. The herein described method of producing zinc, which consists in passing an electric current through a charge containing a compound of zinc, sponge iron, and carbon, thereby heating the charge and reducing the compound of zinc.

5. The herein described method of treating ores containing two or more metals, which consists in first effecting reduction of one of said metals, then passing an electric current through the charge containing such reduced metal, thereby increasing the temperature and causing the reduced metal to react to separate another metal.

6. The herein described method of treating ores containing two or more metals, which consists in first effecting reduction of one of said metals in the form of particles disseminated through the charge, then passing an electric current through the charge containing such disseminated particles, thereby increasing the temperature and causing the reduced metal to react to separate another metal.

7. The herein described method of treating ores containing iron and zinc, which consists in first effecting reduction of iron, then passing an electric current through the reduced iron, thereby increasing the temperature and causing the iron to react to separate zinc.

8. The herein described method of treating ores containing iron and zinc, which consists in first effecting reduction of iron in the form of particles disseminated through the charge, then passing an electric current through the charge containing the disseminated iron, thereby increasing the temperature and causing the iron to react to separate zinc.

In testimony whereof I affix my signature in presence of two witnesses.

WOOLSEY McA. JOHNSON.

Witnesses:
E. T. EWING,
A. M. EWING.